United States Patent
Haskell

(10) Patent No.: US 9,628,821 B2
(45) Date of Patent: Apr. 18, 2017

(54) MOTION COMPENSATION USING DECODER-DEFINED VECTOR QUANTIZED INTERPOLATION FILTERS

(75) Inventor: Barin Geoffry Haskell, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 947 days.

(21) Appl. No.: 12/896,552

(22) Filed: Oct. 1, 2010

(65) Prior Publication Data
US 2012/0082217 A1 Apr. 5, 2012

(51) Int. Cl.
*H04N 19/82* (2014.01)
*H04N 19/117* (2014.01)
(Continued)

(52) U.S. Cl.
CPC .......... *H04N 19/82* (2014.11); *H04N 19/117* (2014.11); *H04N 19/136* (2014.11); *H04N 19/176* (2014.11); *H04N 19/192* (2014.11)

(58) Field of Classification Search
CPC ...... H04N 19/61; H04N 19/176; H04N 19/46; H04N 19/105; H04N 19/172;
(Continued)

(56) References Cited

U.S. PATENT DOCUMENTS 5,541,660 A 7/1996 Kim et al.
5,796,875 A 8/1998 Read
(Continued)

FOREIGN PATENT DOCUMENTS

EP 2262267 A1 12/2010
WO 2004/006558 A2 1/2004
WO 2010/123862 A1 10/2010

OTHER PUBLICATIONS

Haskell et al., Digital Video: An Introduction to MPEG-2—Table of Contents, Chapman & Hall, New York, 1997.
(Continued)

*Primary Examiner* — Frederick Bailey
*Assistant Examiner* — Farhan Mahmud
(74) *Attorney, Agent, or Firm* — Baker Hostetler LLP; Robert L. Hails

(57) ABSTRACT

The present disclosure describes use of dynamically assignable interpolation filters as part of motion compensated prediction. An encoder and a decoder each may store common codebooks that define a variety of interpolation filters that may be applied to predicted video data. During runtime coding, an encoder calculates characteristics of an ideal interpolation filter to be applied to a reference block that would minimize prediction error when the reference block would be used to predict an input block of video data. Once the characteristics of the ideal filter are identified, the encoder may search its local codebook to find a filter that best matches the ideal filter. The encoder may filter the reference block by the best matching filter stored in the codebook as it codes the input block. The encoder also may transmit an identifier of the best matching filter to a decoder, which will use the interpolation filter on predicted block as it decodes coded data for the block. The encoder and decoder may build their codebooks and maintain them independently from the other but in synchronism. The encoder and decoder may use decoded pixel block data as source data for calculation of interpolation filters.

50 Claims, 10 Drawing Sheets

(51) Int. Cl.
H04N 19/136 (2014.01)
H04N 19/176 (2014.01)
H04N 19/192 (2014.01)

(58) Field of Classification Search
CPC .... H04N 19/117; H04N 19/523; H04N 19/70; H04N 19/573; H04N 19/82; H04N 19/14; H04N 19/80; H04N 19/147
USPC .................................................. 375/240–241
See application file for complete search history.

(56) References Cited

U.S. PATENT DOCUMENTS

| | | | |
|---|---|---|---|
| 6,069,670 | A | 5/2000 | Borer |
| 6,442,202 | B1 | 8/2002 | Borer |
| 7,146,311 | B1 | 12/2006 | Uvliden et al. |
| 7,397,858 | B2 | 7/2008 | Garrido et al. |
| 7,664,184 | B2 | 2/2010 | Reznic et al. |
| 7,778,472 | B2 | 8/2010 | Ye et al. |
| 2002/0106026 | A1 | 8/2002 | Demmer |
| 2004/0022318 | A1 | 2/2004 | Garrido et al. |
| 2005/0031211 | A1* | 2/2005 | Meur et al. ............. 382/232 |
| 2006/0294171 | A1 | 12/2006 | Bossen et al. |
| 2008/0075165 | A1 | 3/2008 | Ugur et al. |
| 2008/0089417 | A1 | 4/2008 | Bao et al. |
| 2008/0175322 | A1 | 7/2008 | Lee et al. |
| 2008/0247467 | A1 | 10/2008 | Rusanovskyy et al. |
| 2008/0262312 | A1 | 10/2008 | Carroll et al. |
| 2009/0003717 | A1* | 1/2009 | Sekiguchi et al. ........ 382/238 |
| 2009/0052555 | A1 | 2/2009 | Mak-Fan et al. |
| 2009/0257500 | A1 | 10/2009 | Karczewicz et al. |
| 2009/0274216 | A1 | 11/2009 | Kato et al. |
| 2010/0002770 | A1 | 1/2010 | Motta et al. |
| 2010/0021071 | A1* | 1/2010 | Wittmann et al. ........ 382/232 |
| 2010/0098345 | A1 | 4/2010 | Andersson et al. |
| 2012/0002722 | A1 | 1/2012 | Zheng et al. |

OTHER PUBLICATIONS

Haskell et al., Digital Video: An Introduction to MPEG-2, Chapter 5, pp. 80-109, Chapman & Hall, New York, 1997.
Haskell et al., Digital Video: An Introduction to MPEG-2, Chapter 7, pp. 146-155, Chapman & Hall, New York, 1997.
Wittmann et al., "Separable adaptive interpolation filter," ITU—Telecommunications Standardization Sector, Study Group 16—Contribution 219, Matsushita, Jun. 2007 (COM16-C464-E).
Ye et al., "Enhanced Adaptive Interpolation Filter," ITU—Telecommunications Standardization Sector, Study Group 16—Contribution 464, Qualcomm Inc., Apr. 2008 (COM16-C219-E).
Vatis et al., "Two-dimensional non-separable Adaptive Wiener Interpolation Filter for H.264/AVC," ITU —Telecommunications Standardization Sector, Video Coding Experts Group (VCEG), 26th Meeting: Busan, Korea, Apr. 2005 (VCEG-Z17).
Vatis et al., "Comparison of Complexity between Two-dimensional non-separable Adaptive Interpolation Filter and Standard Wiener Filter ," ITU—Telecommunications Standardization Sector, Video Coding Experts Group (VCEG), 28th Meeting: Nice, France, Apr. 2005 (VCEG-AA11).
Rusanovskyy et al., "Adaptive Interpolation with Directional Filters," ITU—Telecommunications Standardization Sector, Video Coding Experts Group (VCEG), 33rd rd Meeting: Shenzhen, China, Oct. 2007 (VCEG-AG21).
Suzuki et al., "Description of video coding technology proposal by Sony ," Joint Collaborative Team on Video Coding (JCT-VC) of ITU-T SG16 WP3 and ISO/IEC JTC1/SC29/WG11, 1st Meeting: Dresden, Germany, Apr. 2010 (JCTVC-A103_r1).
Huang et al., "A Technical Description of MediaTek's Proposal to the JCT-VC CfP ," Joint Collaborative Team on Video Coding (JCT-VC) of ITU-T SG16 WP3 and ISO/IEC JTC1/SC29/WG11, 1st Meeting: Dresden, Germany, Apr. 2010 (JCTVC-A109_r2).
Segall et al., "A Highly Efficient and Highly Parallel System for Video Coding," Joint Collaborative Team on Video Coding (JCT-VC) of ITU-T SG16 WP3 and ISO/IEC JTC1/SC29/WG11, 1st Meeting: Dresden, Germany, Apr. 2010 (JCTVC-A105).
Huang et al., "Adaptive Quadtree-based Multi-reference loop Filter," ITU—Telecommunications Standardization Sector, Study Group 16 Question 6, Video Coding Experts Group (VCEG), 37th Meeting: Yokohama, Japan, Apr. 15-18, 2009 (VCEG-AK24).
Bjontegaard et al., "Adaptive Deblocking Filter," IEEE Transactions on Circuits and Systems for Video Technology, 13(7): 614-619, Jul. 2003.
Chono et al., "Adaptive motion interpolation on MB basis,"Joint Video Team (JVT) of ISO/IEC MPEG & ITU-T VCEG, (ISO/IEC JTC1/SC29/WG11 and ITU-T SG16 0.6), 3rd Meeting: Fairfax, Virginia, USA, May 6-10, 2002 (JVT-C040).
Wu et al., "Description of video coding technology proposal by Microsoft," Joint Collaborative Team on Video Coding (JCT-VC) of ITU-T SG16 WP3 and ISOI/IEC JTC1/SC29/WG11, 1st Meeting: Dresden, DE, Apr. 15-23, 2010 (JCTVC-A118).
Mitchell et al., MPEG Video Compression Standard—Chapter 1: Introduction, pp. 1-16, Chapman & Hall, New York 1997.
Mitchell et al., MPEG Video Compression Standard—Chapter 2: Overview of MPEG, pp. 17-32, Chapman & Hall, New York 1997.
Mitchell et al., MPEG Video Compression Standard—Chapter 3: The Discrete Cosine Transform, pp. 33-50, Chapman & Hall, New York 1997.
Mitchell et al., MPEG Video Compression Standard—Chapter 4: Aspects of Visual Perception, pp. 51-80, Chapman & Hall, New York 1997.
Mitchell et al., MPEG Video Compression Standard—Chapter 5: MPEG Coding Principles, pp. 81-104, Chapman & Hall, New York 1997.
Mitchell et al., MPEG Video Compression Standard—Chapter 6: Pseudocode and Flowcharts, pp. 105-116, Chapman & Hall, New York 1997.
Mitchell et al., MPEG Video Compression Standard—Chapter 7: MPEG System Syntax, pp. 117-134, Chapman & Hall, New York 1997.
Mitchell et al., MPEG Video Compression Standard—Chapter 8: MPEG-1 Video Syntax, pp. 135-170, Chapman & Hall, New York 1997.
Mitchell et al., MPEG Video Compression Standard—Chapter 9: MPEG-2 Overview, pp. 171-186, Chapman & Hall, New York 1997.
Mitchell et al., MPEG Video Compression Standard—Chapter 10: MPEG-2 Main Profile Syntax, pp. 187-236, Chapman & Hall, New York 1997.
Mitchell et al., MPEG Video Compression Standard—Chapter 11: Motion Compensation, pp. 237-262, Chapman & Hall, New York 1997.
Mitchell et al., MPEG Video Compression Standard—Chapter 12: Pel Reconstruction, pp. 263-282, Chapman & Hall, New York 1997.
Mitchell et al., MPEG Video Compression Standard—Chapter 13: Motion Estimation, pp. 283-312, Chapman & Hall, New York 1997.
Mitchell et al., MPEG Video Compression Standard—Chapter 14: Variable Quantization, pp. 313-332, Chapman & Hall, New York 1997.
Mitchell et al., MPEG Video Compression Standard—Chapter 15: Rate Control in MPEG, pp. 333-356, Chapman & Hall, New York 1997.
Mitchell et al., MPEG Video Compression Standard—Chapter 16: MPEG Patents, pp. 357-362, Chapman & Hall, New York 1997.
Mitchell et al., MPEG Video Compression Standard—Chapter 17: MPEG Vendors and Products, pp. 363-382, Chapman & Hall, New York 1997.
Mitchell et al., MPEG Video Compression Standard—Chapter 18: MPEG History, pp. 383-394, Chapman & Hall, New York 1997.
Mitchell et al., MPEG Video Compression Standard—Chapter 19: Other Video Standards, pp. 395-440, Chapman & Hall, New York 1997.
International Search Report and Written Opinion, dated Dec. 8, 2011, from corresponding International Patent Application No. PCT/US2011/053975, filed Sep. 29, 2011.

(56) References Cited

OTHER PUBLICATIONS

Ye et al., "Buffered Adaptive Interpolation Filters," IEEE International Conference on Multimedia and Expo (ICME), Piscataway, NJ, USA, Jul. 19, 2010, pp. 376-381 XP031761633.
Ugur et al., "Coding Adaptive Interpolation Filter Coefficients," ITU—Telecommunications Standardization Sector, Study Group 16 Question 6, Video Coding Experts Group (VCEG), 31st Meeting: Marrakech, MA, Jan. 15-16, 2007 (VCEG-AE20).
Zhang et al., "A Single-Pass Based Adaptive Interpolation Filtering Algorithm for Video Coding," Proceedings of 2010 IEEE 17th International Conference on Image Processing (ICIP), Sep. 26-29, 2010, Hong Kong, pp. 3401-3404 (XP031814182).
Chujoh et al., "Specification and experimental results of Quadtree-based Adaptive Loop Filter," ITU—Telecommunications Standardization Sector, Video Coding Experts Group (VCEG), 37th Meeting: Yokohama, Japan Apr. 15-18, 2009 (VCEG-AK22 r1).
Chujoh et al., "Block-based Adaptive Loop Filter," ITU—Telecommunications Standardization Sector, Video Coding Experts Group (VCEG), 35th Meeting: Berlin, Germany, Jul. 16-18, 2008 (VCEG-AI18).
Amonou et al., "Description of video coding technology proposal by France Telecom, NTT, NTT DOCOMO, Panasonic and Technicolor," Joint Collaborative Team on Video Coding (JCT-VC) of ITU-T SG16 WP3 and ISO/IEC JTC1/SC29/WG11, 1st Meeting: Dresden, DE, Apr. 15-23, 2010 (JCTVC-A114).
Huang et al., "A Technical Description of MediaTek's Proposal to the JCT-VC CfP," Joint Collaborative Team on Video Coding (JCT-VC) of ITU-T SG16 WP3 and ISO/IEC JTC1/SC29/WG11, 1st Meeting: Dresden, DE, Apr. 15-23, 2010 (JCTVC-A109 r2).
Chiu et al., "Description of video coding technology proposal: self derivation of motion estimation and adaptive (Wiener) loop filtering," Joint Collaborative Team on Video Coding (JCT-VC) of ITU-T SG16 WP3 and ISO/IEC JTC1/SC29/WG11, 1st Meeting: Dresden, DE, Apr. 15-23, 2010.
Chono et al., "Description of video coding technology proposal by NEC Corporation," Joint Collaborative Team on Video Coding (JCT-VC) of ITU-T SG16 WP3 and ISO/IEC JTC1/SC29/WG11, 1st Meeting: Dresden, DE, Apr. 15-23, 2010.
Vatis et al., "Comparison of Complexity between Two-dimensional non-separable Adaptive Interpolation Filter and Standard Weiner Filter," ITU—Telecommunications Standardization Sector, Video Coding Experts Group (VCEG), 28th Meeting: Nice, FR, Apr. 16-22, 2005 (VCEG-AA11).
Vatis et al., "Two-dimensional non-separable Adaptive Wiener Interpolation Filter for H.264/AVC," ITU—Telecommunications Standardization Sector, Video Coding Experts Group (VCEG), 26th Meeting: Busan, KR, Apr. 16-22, 2005 (VCEG-Z17).
Wittmann et al., "Separable adaptive interpolation filter," ITU—Telecommunications Standardization Sector, Study Group 16—Contribution 219, Jun. 2007 (COM16-C219-E).
Ye et al., "Enhanced Adaptive Interpolation Filter," ITU—Telecommunications Standardization Sector, Study Group 16—Contribution 464, Apr. 2008 (COM16-C464-E).
Suzuki et al., "Description of video coding technology proposal by Sony," Joint Collaborative Team on Video Coding (JCT-VC) of ITU-T SG16 WP3 and ISO/IEC JTC1/SC29/WG11, 1st Meeting: Dresden, DE, Apr. 15-23, 2010 (JCTVC-A103).
Segall et al., "A Highly Efficient and Highly Parallel System for Video Coding," Joint Collaborative Team on Video Coding (JCT-VC) of ITU-T SG16 WP3 and ISO/EC JTC1ISC29/WG11, 1st Meeting: Dresden, DE, Apr. 15-23, 2010 (JCTVC-A105).
Haskell et al., Digital Video: An Introduction to MPEG-2—Chapter 1: Introduction to Digital Multimedia, Compression and MPEG-2, pp. 1-13, Chapman & Hall, New York, 1997.
Haskell et al., Digital Video: An Introduction to MPEG-2—Chapter 2: Anatomy of MPEG-2, pp. 14-31, Chapman & Hall, New York, 1997.
Haskell et al., Digital Video: An Introduction to MPEG-2—Chapter 3: MPEG-2 Systems, pp. 32-54, Chapman & Hall, New York, 1997.
Haskell et al., Digital Video: An Introduction to MPEG-2—Chapter 4: Audio, pp. 55-79, Chapman & Hall, New York, 1997.
Haskell et al., Digital Video: An Introduction to MPEG-2—Chapter 5: Video Basics, pp. 80-109, Chapman & Hall, New York, 1997.
Haskell et al., Digital Video: An Introduction to MPEG-2—Chapter 6: Digital Compression: Fundamentals, pp. 110-145, Chapman & Hall, New York, 1997.
Haskell et al., Digital Video: An Introduction to MPEG-2—Chapter 7: Motion Compensation Modes in MPEG, pp. 146-155, Chapman & Hall, New York, 1997.
Haskell et al., Digital Video: An Introduction to MPEG-2—Chapter 8: MPEG-2 Video Coding and Compression, pp. 156-182, Chapman & Hall, New York, 1997.
Haskell et al., Digital Video: An Introduction to MPEG-2—Chapter 9: MPEG-2 Scalability Techniques, pp. 183-229, Chapman & Hall, New York, 1997.
Haskell et al., Digital Video: An Introduction to MPEG-2—Chapter 10: Video Stream Syntax and Semantics, pp. 230-257, Chapman & Hall, New York, 1997.
Haskell et al., Digital Video: An Introduction to MPEG-2—Chapter 11: Requirements and Profiles, pp. 258-279, Chapman & Hall, New York, 1997.
Haskell et al., Digital Video: An Introduction to MPEG-2—Chapter 12: Digital Networks, pp. 280-291, Chapman & Hall, New York, 1997.
Haskell et al., Digital Video: An Introduction to MPEG-2—Chapter 13: Interactive Television, pp. 292-306, Chapman & Hall, New York, 1997.
Haskell et al., Digital Video: An Introduction to MPEG-2—Chapter 14: High Definition Television (HDTV), pp. 307-321, Chapman & Hall, New York, 1997.
Haskell et al., Digital Video: An Introduction to MPEG-2—Chapter 15: Three-Dimensional TV, pp. 322-359, Chapman & Hall, New York, 1997.
Haskell et al., Digital Video: An Introduction to MPEG-2—Chapter 16: Processing Architecture and Implementation Dr. Horng-Dar Lin, pp. 361-368, Chapman & Hall, New York, 1997.
Haskell et al., Digital Video: An Introduction to MPEG-2—Chapter 17: MPEG-4 and the Future, pp. 369-411, Chapman & Hall, New York, 1997.
Netravali et al., Digital Pictures: Representation, Compression, and Standards—Chapter 1: Numerical Representation of Visual Information, pp. 1-92, Second Edition, Plenum Press, New York 1988.
Netravali et al., Digital Pictures: Representation, Compression, and Standards—Chapter 2: Common Picture Communications Systems, pp. 93-156, Second Edition, Plenum Press, New York 1988.
Netravali et al., Digital Pictures: Representation, Compression, and Standards—Chapter 3: Redundancy-Statistics-Models, pp. 157-252, Second Edition, Plenum Press, New York 1988.
Netravali et al., Digital Pictures: Representation, Compression, and Standards—Chapter 4: Visual Psychophysics, pp. 253-308, Second Edition, Plenum Press, New York 1988.
Netravali et al., Digital Pictures: Representation, Compression, and Standards—Chapter 5: Basic Compression Techniques, pp. 309-520, Second Edition, Plenum Press, New York 1988 (in 2 parts).
Netravali et al., Digital Pictures: Representation, Compression, and Standards—Chapter 6: Examples of Codec Designs, pp. 521-570, Second Edition, Plenum Press, New York 1988.
Netravali et al., Digital Pictures: Representation, Compression, and Standards—Chapter 7: Still Image Coding Standards—ISO JBIG and JPEG, pp. 571-594, Second Edition, Plenum Press, New York 1988.
Netravali et al., Digital Pictures: Representation, Compression, and Standards—Chapter 8: CCITT H.261 (P*64) Videoconferencing Coding Standards, pp. 595-612, Second Edition, Plenum Press, New York 1988.
Netravali et al., Digital Pictures: Representation, Compression, and Standards—Chapter 9: Coding for Entertainment Video—ISO MPEG, pp. 613-640, Second Edition, Plenum Press, New York 1988.
ITU-T Recommendation H.264, Advanced Video Coding for Generic Audiovisual Services (Mar. 2010).

(56) References Cited

OTHER PUBLICATIONS

ITU-T Recommendation H.263, Video Coding for Low Bit Rate Communication (Jan. 2005).

Wedi, "Adaptive Interpolation Filter for Motion Compensated Hybrid Video Coding," Proc. Picture Coding Symposium (PCS 2001), Seoul, Korea, Apr. 2001.

Motta et al., "Improved Filter Selection for B-Slices in E-AIF," ITU—Telecommunications Standardization Sector, Video Coding Experts Group (VCEG), 35th Meeting: Berlin, Germany, Jul. 2008,(VCEG-AI38).

Ramamurthi et al., "Classified Vector Quantization of Images," IEEE Transactions on Communications, vol. COM-34 No. 11, Nov. 1, 1986.

Kimata et al., "3D Motion Vector Coding with Block Base Adaptive Interpolation Filter on H.264," Proceedings of the 2003 IEEE International Conference on Acoustics, Speech, and Signal Processing, Apr. 6-10, 2003, Hong Kong.

Vatis et al., "Locally Adaptive Non-Separable Interpolation Filter for H.264/AVC," Proceedings of the 2006 IEEE International Conference on Image Processing, Oct. 8, 2006, New York, NY.

Fowler et al., "A Survey of Adaptive Vector Quantization—Part I: A Unifying Structure," Proceedings of the Data Compression Conference, Mar. 25, 1997.

Fowler et al., "A Survey of Adaptive Vector Quantization—Part II: Classification and Comparison of Algorithms," IPS Laboratory Technical Report, Mar. 1, 1997.

Shen et al., "An Adaptive and Fast Fractional Pixel Search Algorithm in H.264," Signal Processing, Elsevier Science Publishers B.V. Amsterdam, NL, vol. 87(11): 2629-2639, Aug. 1, 2007.

Keman et al., "Half-Pixel Motion Estimation Bypass Based on a Linear Model," Picture Coding Symposium, Dec. 15, 2004, San Francisco, CA.

Zhang et al., "Single-Pass Encoding Using Multiple Adaptive Interpolation Filters," 37th VCEG Meeting, Apr. 15-18, 2009, Yokohama, JP.

Vatis et al., "Rate-distortion optimised coder control for adaptive interpolation filter in the KTA reference model," 31st VCEG Meeting, Jan. 15-16, 2007, Marrakech, MA.

Ren et al., "Comparison of Power Consumption for Motion Compensation and Deblocking Filters in High Definition Video Coding," IEEE International Symposium on Consumer Electronics, Jun. 1, 2007.

Wedi et al., "Interpolation Filters for Motion Compensated Prediction with 1/4 and 1/8-pel Accuracy," Tenth VCEG Meeting, May 16-18, 2000, Osaka, JP.

Ribas-Corbera et al., "On the Optimal Motion Vector Accuracy for Block-Based Motion-Compensation Video Coders," International Society for Optical Engineering, SPIE Proceedings, Bellingham, WA, vol. 2668, Jan. 1, 1996.

\* cited by examiner

100

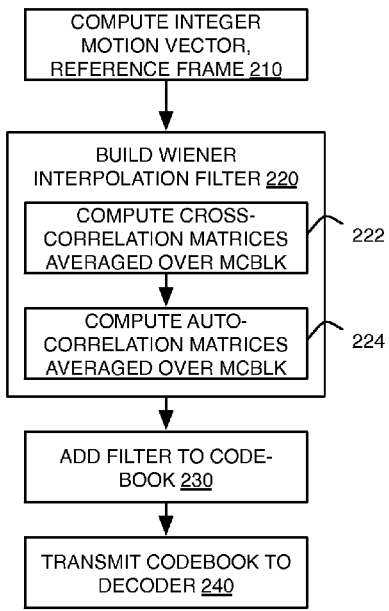
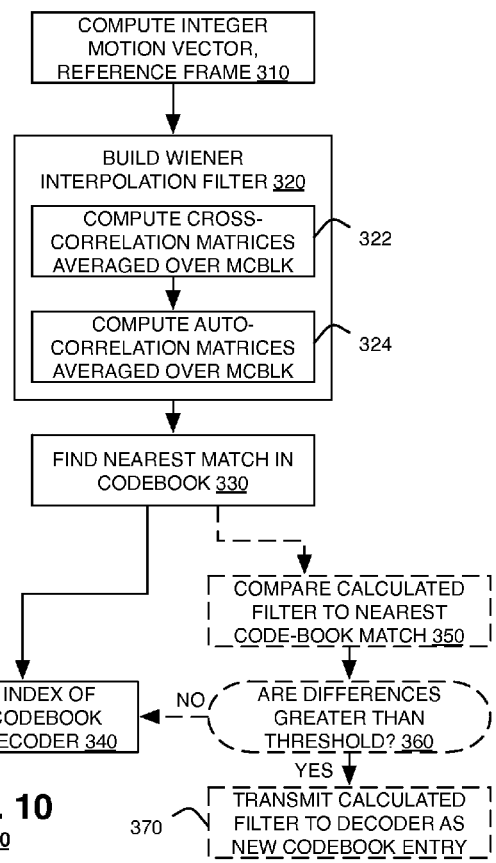
FIG. 9
200
FIG. 10
300

500

600

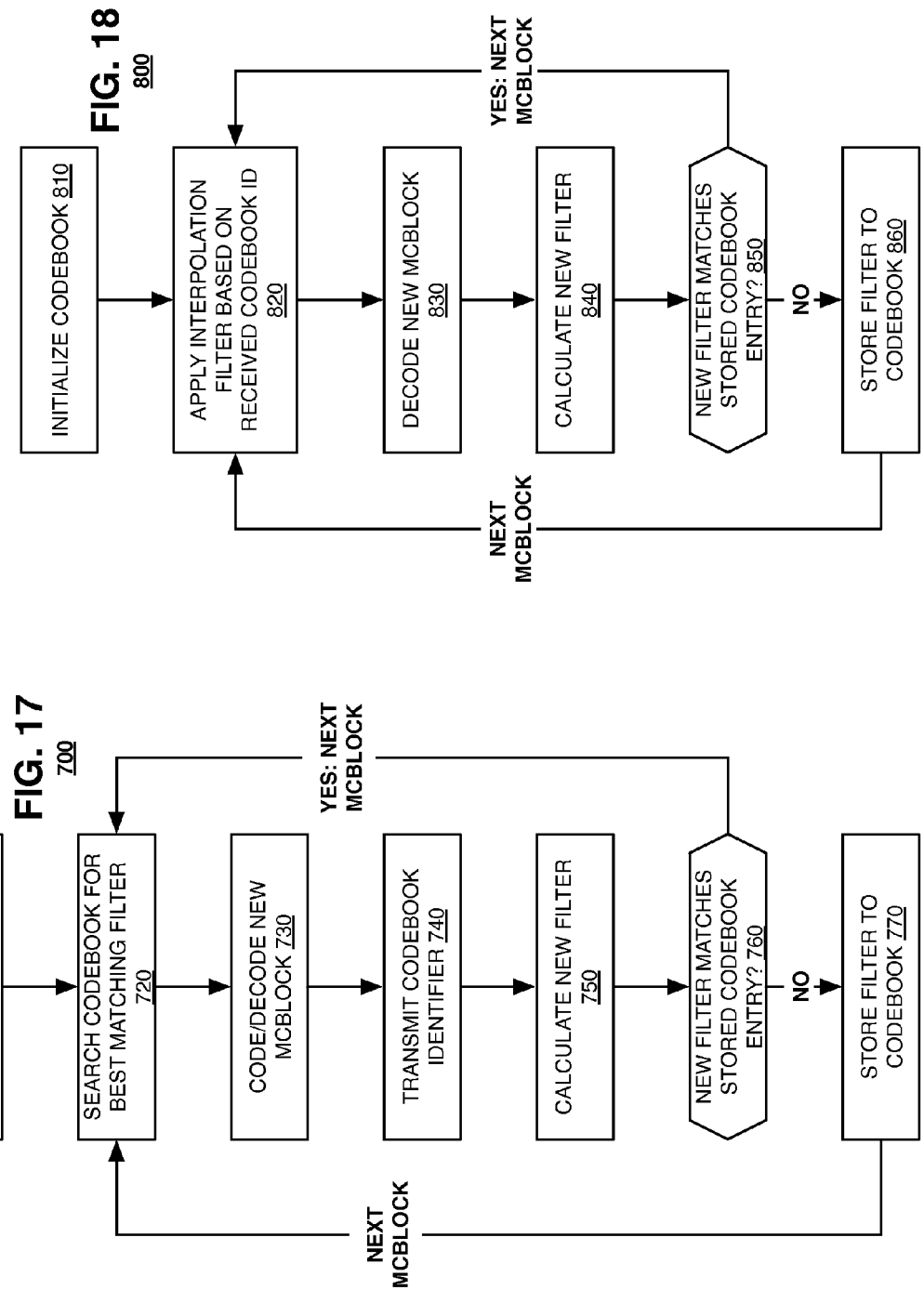

MOTION COMPENSATION USING DECODER-DEFINED VECTOR QUANTIZED INTERPOLATION FILTERS

BACKGROUND

The present invention relates to video coding and, more particularly, to video coding system using interpolation filters as part of motion-compensated coding.

Video codecs typically code video frames using a discrete cosine transform ("DCT") on blocks of pixels, called "pixel blocks" herein, much the same as used for the original JPEG coder for still images. An initial frame (called an "intra" frame) is coded and transmitted as an independent frame. Subsequent frames, which are modeled as changing slowly due to small motions of objects in the scene, are coded efficiently in the inter mode using a technique called motion compensation ("MC") in which the displacement of pixel blocks from their position in previously-coded frames are transmitted as motion vectors together with a coded representation of a difference between a predicted pixel block and a pixel block from the source image.

A brief review of motion compensation is provided below. FIGS. 1 and 2 show a block diagram of a motion-compensated image coder/decoder system. The system combines transform coding (in the form of the DCT of pixel blocks of pixels) with predictive coding (in the form of differential pulse coded modulation ("PCM")) in order to reduce storage and computation of the compressed image, and at the same time to give a high degree of compression and adaptability. Since motion compensation is difficult to perform in the transform domain, the first step in the interframe coder is to create a motion compensated prediction error. This computation requires one or more frame stores in both the encoder and decoder. The resulting error signal is transformed using a DCT, quantized by an adaptive quantizer, entropy encoded using a variable length coder ("VLC") and buffered for transmission over a channel.

The way that the motion estimator works is illustrated in FIG. 3. In its simplest form the current frame is partitioned into motion compensation blocks, called "mcblocks" herein, of constant size, e.g., 16×16 or 8×8. However, variable size mcblocks are often used, especially in newer codecs such as H.264. ITU-T Recommendation H.264, Advanced Video Coding. Indeed nonrectangular mcblocks have also been studied and proposed. Mcblocks are generally larger than or equal to pixel blocks in size.

Again, in the simplest form of motion compensation, the previous decoded frame is used as the reference frame, as shown in FIG. 3. However, one of many possible reference frames may also be used, especially in newer codecs such as H.264. In fact, with appropriate signaling, a different reference frame may be used for each mcblock.

Each mcblock in the current frame is compared with a set of displaced mcblocks in the reference frame to determine which one best predicts the current mcblock. When the best matching mcblock is found, a motion vector is determined that specifies the displacement of the reference mcblock.

Exploiting Spatial Redundancy

Because video is a sequence of still images, it is possible to achieve some compression using techniques similar to JPEG. Such methods of compression are called intraframe coding techniques, where each frame of video is individually and independently compressed or encoded. Intraframe coding exploits the spatial redundancy that exists between adjacent pixels of a frame. Frames coded using only intra-frame coding are called "I-frames".

Exploiting Temporal Redundancy

In the unidirectional motion estimation described above, called "forward prediction", a target mcblock in the frame to be encoded is matched with a set of mcblocks of the same size in a past frame called the "reference frame". The mcblock in the reference frame that "best matches" the target mcblock is used as the reference mcblock. The prediction error is then computed as the difference between the target mcblock and the reference mcblock. Prediction mcblocks do not, in general, align with coded mcblock boundaries in the reference frame. The position of this best-matching reference mcblock is indicated by a motion vector that describes the displacement between it and the target mcblock. The motion vector information is also encoded and transmitted along with the prediction error. Frames coded using forward prediction are called "P-frames".

The prediction error itself is transmitted using the DCT-based intraframe encoding technique summarized above.

Bidirectional Temporal Prediction

Bidirectional temporal prediction, also called "Motion-Compensated Interpolation", is a key feature of modern video codecs. Frames coded with bidirectional prediction use two reference frames, typically one in the past and one in the future. However, two of many possible reference frames may also be used, especially in newer codecs such as H.264. In fact, with appropriate signaling, different reference frames may be used for each mcblock.

A target mcblock in bidirectionally-coded frames can be predicted by a mcblock from the past reference frame (forward prediction), or one from the future reference frame (backward prediction), or by an average of two mcblocks, one from each reference frame (interpolation). In every case, a prediction mcblock from a reference frame is associated with a motion vector, so that up to two motion vectors per mcblock may be used with bidirectional prediction. Motion-Compensated Interpolation for a mcblock in a bidirectionally-predicted frame is illustrated in FIG. 4. Frames coded using bidirectional prediction are called "B-frames".

Bidirectional prediction provides a number of advantages. The primary one is that the compression obtained is typically higher than can be obtained from forward (unidirectional) prediction alone. To obtain the same picture quality, bidirectionally-predicted frames can be encoded with fewer bits than frames using only forward prediction.

However, bidirectional prediction does introduce extra delay in the encoding process, because frames must be encoded out of sequence. Further, it entails extra encoding complexity because mcblock matching (the most computationally intensive encoding procedure) has to be performed twice for each target mcblock, once with the past reference frame and once with the future reference frame.

Typical Encoder Architecture for Bidirectional Prediction

FIG. 5 shows a typical bidirectional video encoder. It is assumed that frame reordering takes place before coding, i.e., I- or P-frames used for B-frame prediction must be coded and transmitted before any of the corresponding B-frames. In this codec, B-frames are not used as reference frames. With a change of architecture, they could be as in H.264.

Input video is fed to a Motion Compensation Estimator/Predictor that feeds a prediction to the minus input of the subtractor. For each mcblock, the Inter/Intra Classifier then compares the input pixels with the prediction error output of the subtractor. Typically, if the mean square prediction error exceeds the mean square pixel value, an intra mcblock is decided. More complicated comparisons involving DCT of both the pixels and the prediction error yield somewhat better performance, but are not usually deemed worth the cost.

For intra mcblocks the prediction is set to zero. Otherwise, it comes from the Predictor, as described above. The prediction error is then passed through the DCT and quantizer before being coded, multiplexed and sent to the Buffer.

Quantized levels are converted to reconstructed DCT coefficients by the Inverse Quantizer and then the inverse is transformed by the inverse DCT unit ("IDCT") to produce a coded prediction error. The Adder adds the prediction to the prediction error and clips the result, e.g., to the range 0 to 255, to produce coded pixel values.

For B-frames, the Motion Compensation Estimator/Predictor uses both the previous frame and the future frame kept in picture stores.

For I- and P-frames, the coded pixels output by the Adder are written to the Next Picture Store, while at the same time the old pixels are copied from the Next Picture store to the Previous Picture store. In practice, this is usually accomplished by a simple change of memory addresses.

Also, in practice the coded pixels may be filtered by an adaptive deblocking filter prior to entering the picture stores. This improves the motion compensation prediction, especially for low bit rates where coding artifacts may become visible.

The Coding Statistics Processor in conjunction with the Quantizer Adapter controls the output bit-rate and optimizes the picture quality as much as possible.

Typical Decoder Architecture for Bidirectional Prediction

FIG. 6 shows a typical bidirectional video decoder. It has a structure corresponding to the pixel reconstruction portion of the encoder using inverting processes. It is assumed that frame reordering takes place after decoding and video output. The interpolation filter might be placed at the output of the motion compensated predictor as in the encoder.

Fractional Motion Vector Displacements

FIG. 3 and FIG. 4 show reference mcblocks in reference frames as being displaced vertically and horizontally with respect to the position of the current mcblock being decoded in the current frame. The amount of the displacement is represented by a two-dimensional vector [dx, dy], called the motion vector. Motion vectors may be coded and transmitted, or they may be estimated from information already in the decoder, in which case they are not transmitted. For bidirectional prediction, each transmitted mcblock requires two motion vectors.

In its simplest form, dx and dy are signed integers representing the number of pixels horizontally and the number of lines vertically to displace the reference mcblock. In this case, reference mcblocks are obtained merely by reading the appropriate pixels from the reference stores.

However, in newer video codecs it has been found beneficial to allow fractional values for dx and dy. Typically, they allow displacement accuracy down to a quarter pixel, i.e., an integer+−0.25, 0.5 or 0.75.

Fractional motion vectors require more than simply reading pixels from reference stores. In order to obtain reference mcblock values for locations between the reference store pixels, it is necessary to interpolate between them.

Simple bilinear interpolation can work fairly well. However, in practice it has been found beneficial to use two-dimensional interpolation filters especially designed for this purpose. In fact, for reasons of performance and practicality, the filters are often not shift-invariant filters. Instead different values of fractional motion vectors may utilize different interpolation filters.

Motion Compensation Using Adaptive Interpolation Filters

The optimum motion compensation interpolation filter depends on a number of factors. For example, objects in a scene may not be moving in pure translation. There may be object rotation, both in two dimensions and three dimensions. Other factors include zooming, camera motion and lighting variations caused by shadows, or varying illumination.

Camera characteristics may vary due to special properties of their sensors. For example, many consumer cameras are intrinsically interlaced, and their output may be de-interlaced and filtered to provide pleasing-looking pictures free of interlacing artifacts. Low light conditions may cause an increased exposure time per frame, leading to motion dependent blur of moving objects. Pixels may be non-square.

Thus, in many cases improved performance can be had if the motion compensation interpolation filter can adapt to these and other outside factors. In such systems interpolation filters may be designed by minimizing the mean square error between the current mcblocks and their corresponding reference mcblocks over each frame. These are the so-called Wiener filters. The filter coefficients would then be quantized and transmitted at the beginning of each frame to be used in the actual motion compensated coding.

BRIEF DESCRIPTION OF THE DRAWINGS

FIG. 9 illustrates a method according to an embodiment of the present invention.

FIG. 10 illustrates a method according to another embodiment of the present invention.

FIG. 17 illustrates a method according to an embodiment of the present invention.

FIG. 18 illustrates another method according to an embodiment of the present invention.

DETAILED DESCRIPTION

Embodiments of the present invention provide a video coder/decoder system that uses dynamically assignable interpolation filters as part of motion compensated prediction. An encoder and a decoder each may store common codebooks that define a variety of interpolation filters that may be applied to predicted video data. During runtime coding, an encoder calculates characteristics of an ideal interpolation filter to be applied to a reference block that would minimize prediction error when the reference block would be used to predict an input block of video data. Once the characteristics of the ideal filter are identified, the encoder may search its local codebook to find a filter that best matches the ideal filter. The encoder may filter the reference block by the best matching filter stored in the codebook as it codes the input block. The encoder also may transmit an identifier of the best matching filter to a decoder, which will use the interpolation filter on a predicted block as it decodes coded data for the block.

Motion Compensation Using Vector Quantized Interpolation Filters—VQIF

Improved codec performance can be achieved if an interpolation filter can be adapted to each mcblock. However, transmitting a filter per mcblock is usually too expensive. Accordingly, embodiments of the present invention propose to use a codebook of filters and send an index into the codebook for each mcblock.

Figure 1:
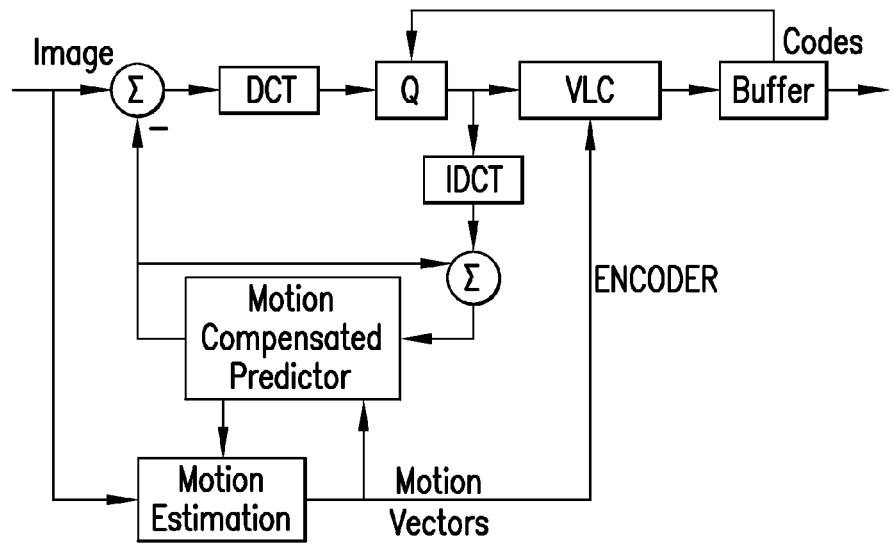
FIG. 1 is a block diagram of a conventional video coder.
Figure 2:
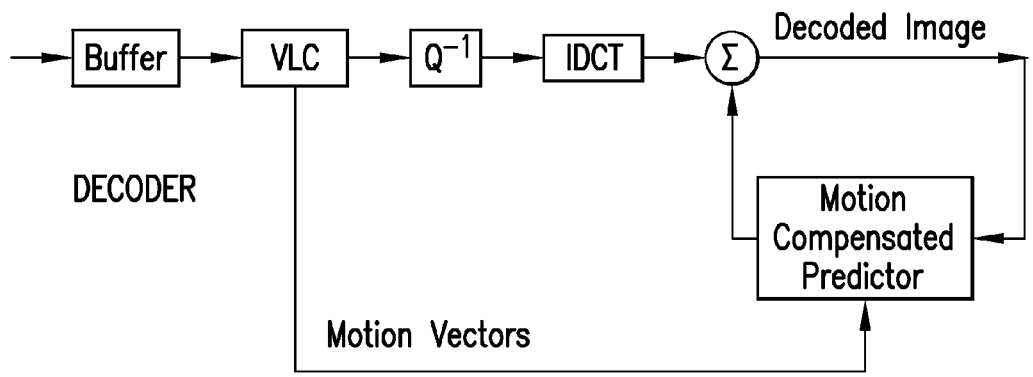
FIG. 2 is a block diagram of a conventional video decoder.
Figure 3:
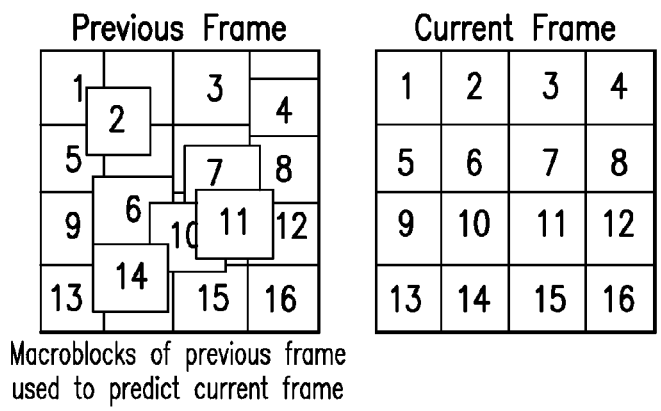
FIG. 3 illustrates principles of motion compensated prediction.
Figure 4:
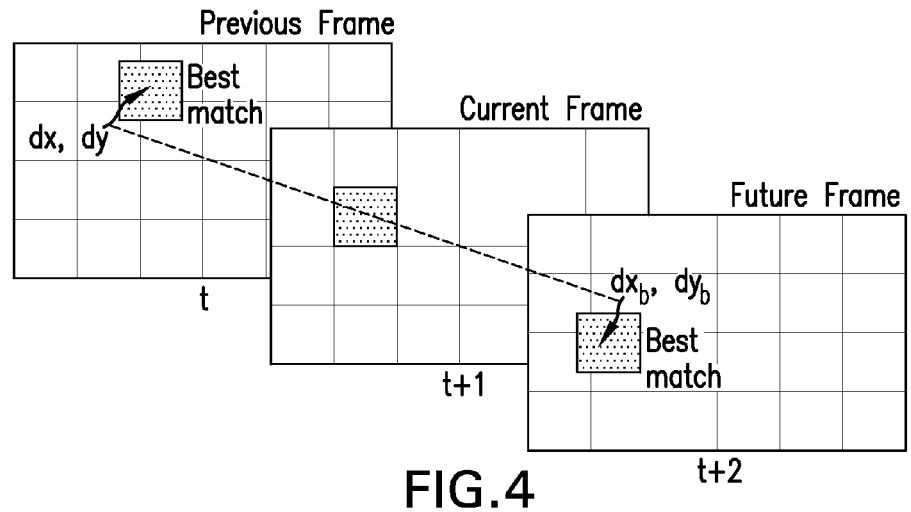
FIG. 4 illustrates principles of bidirectional temporal prediction.
Figure 5:
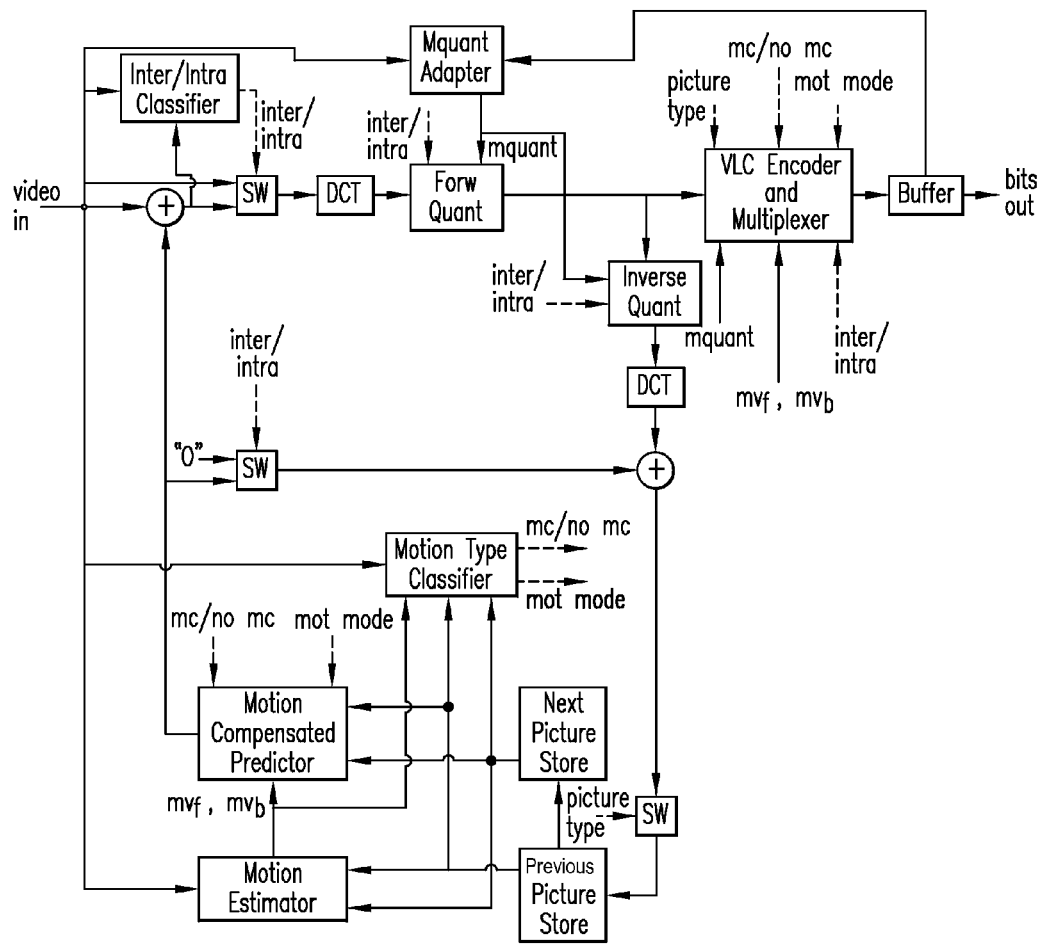
FIG. 5 is a block diagram of a conventional bidirectional video coder.
Figure 6:
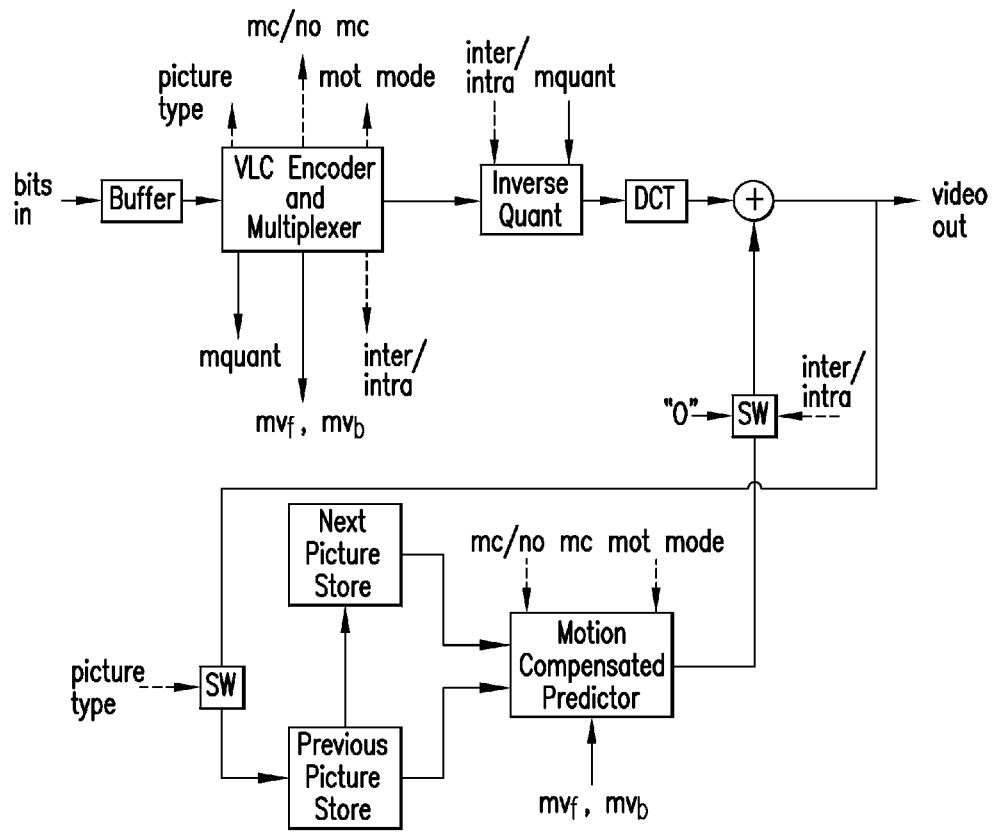
FIG. 6 is a block diagram of a conventional bidirectional video decoder.
Figure 7:
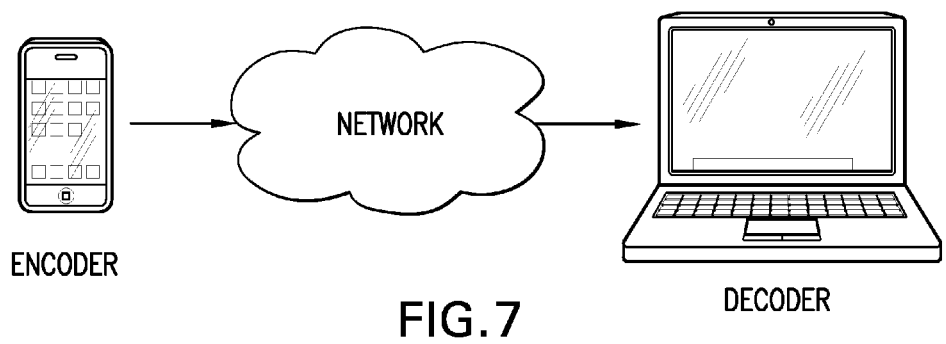
FIG. 7 illustrates an encoder/decoder system suitable for use with embodiments of the present invention.
Figure 8:
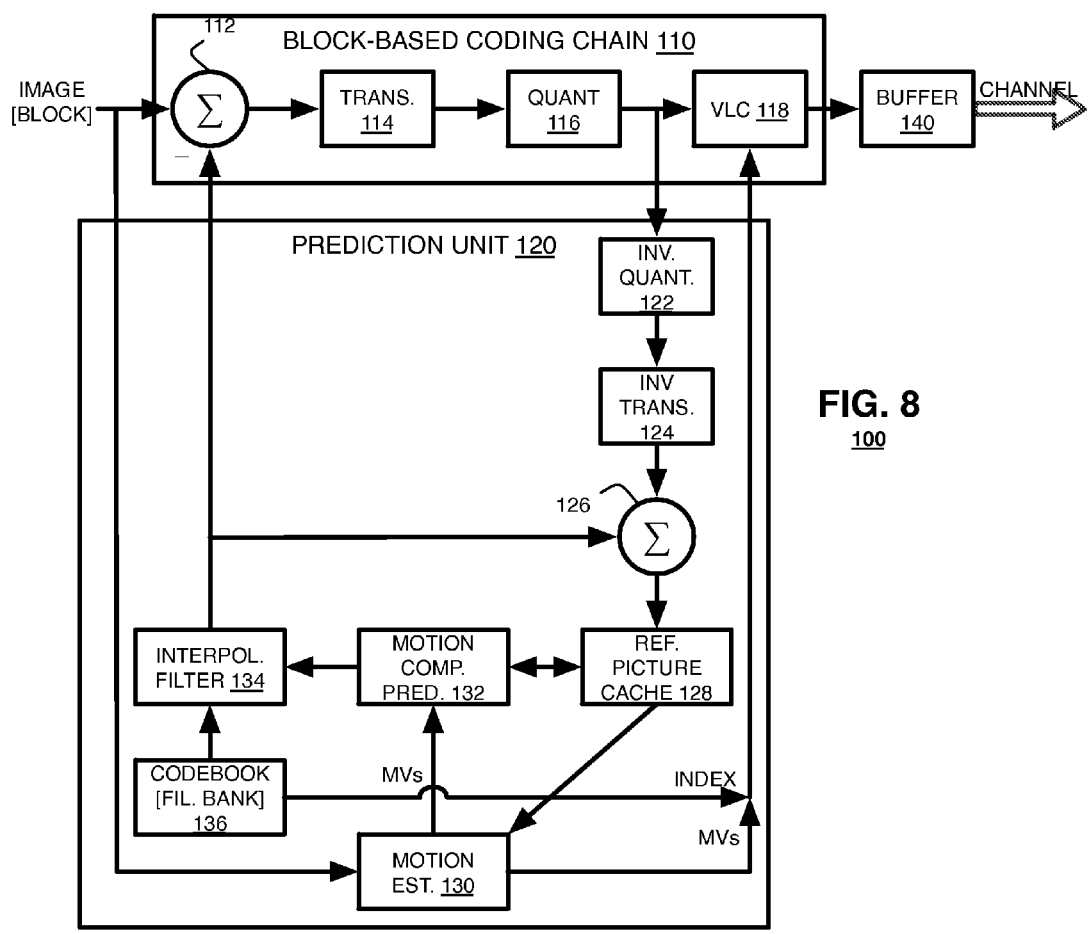
FIG. 8 is a simplified block diagram of a video encoder according to an embodiment of the present invention.
Figure 11:
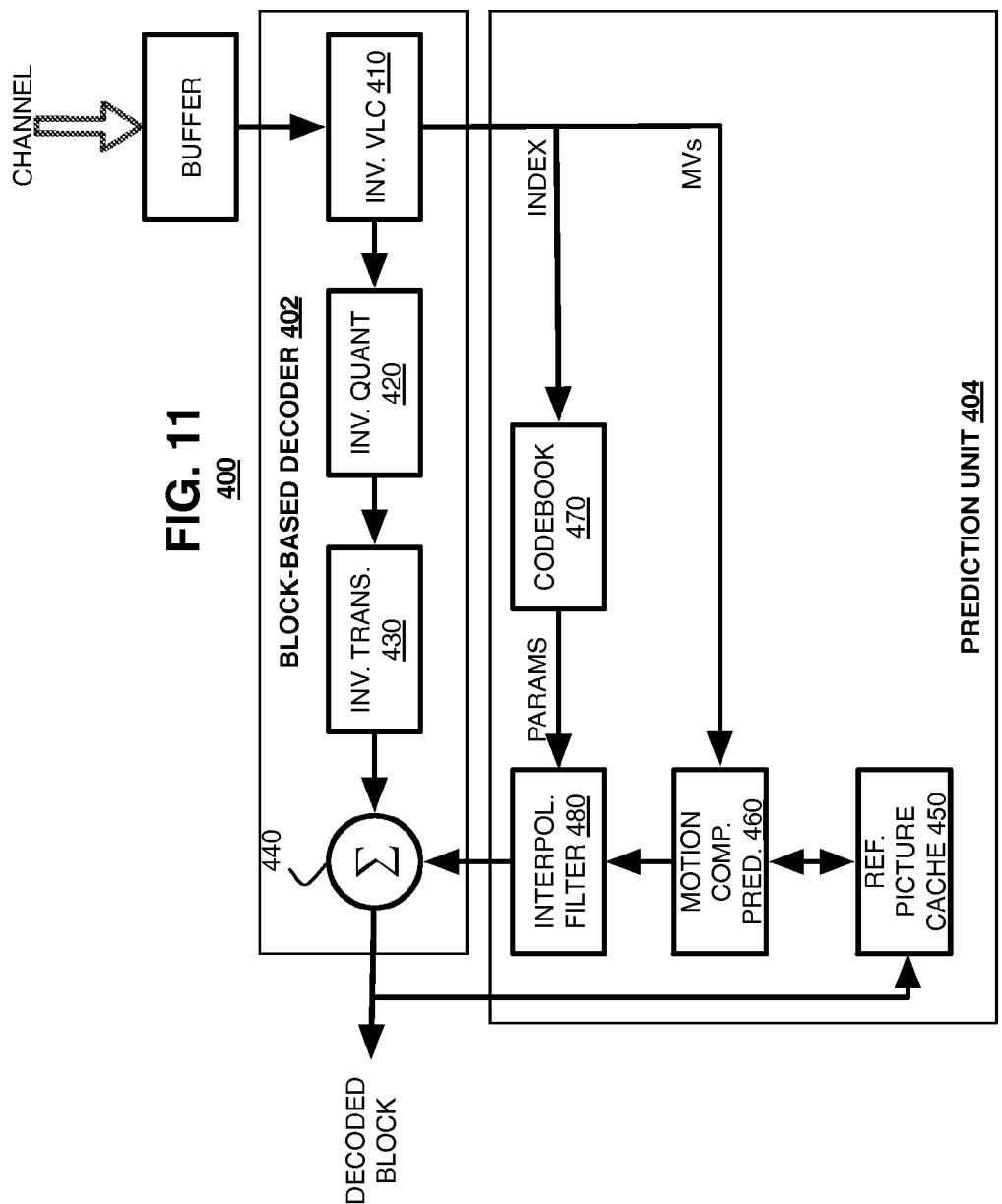
FIG. 11 is a simplified block diagram of a video decoder according to an embodiment of the present invention.

Embodiments of the present invention provide a method of building and applying filter codebooks between an encoder and a decoder (FIG. 7). FIG. 8 illustrates a simplified block diagram of an encoder system showing operation of the interpolation filter. FIG. 9 illustrates a method of building a codebook according to an embodiment of the present invention. FIG. 10 illustrates a method of using a codebook during runtime coding and decoding according to an embodiment of the present invention. FIG. 11 illustrates a simplified block diagram of a decoder showing operation of the interpolation filter and consumption of the codebook indices.

FIG. 8 is a simplified block diagram of an encoder suitable for use with the present invention. The encoder 100 may include a block-based coding chain 110 and a prediction unit 120.

The block coding chain 110 may include a subtractor 112, a transform unit 114, a quantizer 116 and a variable length coder 118. The subtractor 112 may receive an input mcblock from a source image and a predicted mcblock from the prediction unit 120. It may subtract the predicted mcblock from the input mcblock, generating a block of pixel residuals. The transform unit 114 may convert the mcblock's residual data to an array of transform coefficient according to a spatial transform, typically a discrete cosine transform ("DCT") or a wavelet transform. The quantizer 116 may truncate transform coefficients of each block according to a quantization parameter ("QP"). The QP values used for truncation may be transmitted to a decoder in a channel. The variable length coder 118 may code the quantized coefficients according to an entropy coding algorithm, for example, a variable length coding algorithm. Following variable length coding, the coded data of each mcblock may be stored in a buffer 140 to await transmission to a decoder via a channel.

The prediction unit 120 may include: an inverse quantization unit 122, an inverse transform unit 124, an adder 126, a reference picture cache 128, a motion estimator 130, a motion compensated predictor 132, an interpolation filter 134 and a codebook 136. The inverse quantization unit 122 may quantize coded video data according to the QP used by the quantizer 116. The inverse transform unit 124 may transform re-quantized coefficients to the pixel domain. The adder 126 may add pixel residuals output from the inverse transform unit 124 with predicted motion data from the motion compensated predictor 132. The reference picture cache 128 may store recovered frames for use as reference frames during coding of later-received mcblocks. The motion estimator 130 may estimate image motion between a source image being coded and reference frame(s) stored in the reference picture cache. For example, it may select a prediction mode to be used (for example, unidirectional P-coding or bidirectional B-coding), and generate motion vectors for use in such predictive coding. The motion compensated predictor 132 may generate a predicted mcblock for use by the block coder. In this regard, the motion compensated predictor may retrieve stored mcblock data of the selected reference frames. The interpolation filter 134 may filter a predicted mcblock from the motion compensated predictor 132 according to configuration parameters output by codebook 136. The codebook 136 may store configuration data that defines operation of the interpolation filter 134. Different instances of configuration data are identified by an index into the codebook.

During coding operations, motion vectors, quantization parameters and codebook indices may be output to a channel along with coded mcblock data for decoding by a decoder (not shown).

FIG. 9 illustrates a method according to an embodiment of the present invention. According to the embodiment, a codebook may be constructed by using a large set of training sequences having a variety of detail and motion characteristics. For each mcblock, an integer motion vector and reference frame may be computed according to traditional techniques (box 210). Then, an N×N Wiener interpolation filter may be constructed (box 220) by computing cross-correlation matrices (box 222) and auto-correlation matrices (box 224) between uncoded pixels and coded pixels from the reference picture cache, each averaged over the mcblock. Alternatively, the cross-correlation matrices and auto-correlation matrices may be averaged over a larger surrounding area having similar motion and detail as the mcblock. The interpolation filter may be a rectangular interpolation filter or a circularly-shaped Wiener interpolation filter.

This procedure may produce auto-correlation matrices that are singular, which means that some of the filter coefficients may be chosen arbitrarily. In these cases, the affected coefficients farthest from the center may be chosen to be zero.

The resulting filter may be added to the codebook (box 230). Filters may be added pursuant to vector quantization ("VQ") clustering techniques, which are designed to either produce a codebook with a desired number of entries or a codebook with a desired accuracy of representation of the filters. Once the codebook is established, it may be transmitted to the decoder (box 240). After transmission, both the encoder and decoder may store a common codebook, which may be referenced during runtime coding operations.

Transmission to a decoder may occur in a variety of ways. The codebook may then be transmitted periodically to the decoder during encoding operations. Alternatively, the codebook may be coded into the decoder a priori, either from coding operations performed on generic training data or by representation in a coding standard. Other embodiments permit a default codebook to be established in an encoder and decoder but to allow the codebook to be updated adaptively by transmissions from the encoder to the decoder.

Indices into the codebook may be variable length coded based on their probability of occurrence, or they may be arithmetically coded.

FIG. 10 illustrates a method for runtime encoding of video, according to an embodiment of the present invention. For each mcblock to be coded, an integer motion vector and reference frame(s) may be computed (box 310), coded and transmitted. Then an N×N Wiener interpolation filter may be constructed for the mcblock (box 320) by computing cross-correlation matrices (box 322) and auto-correlation matrices (box 324) averaged over the mcblock. Alternatively, the cross-correlation matrices and auto-correlation matrices may be averaged over a larger surrounding area that has similar motion and detail as the mcblock. The interpolation filter may be a rectangular interpolation filter or a circularly-shaped Wiener interpolation filter.

Once the interpolation filter is established, the codebook may be searched for a previously-stored filter that best matches the newly-constructed interpolation filter (box 330). The matching algorithm may proceed according to vector quantization search methods. When a matching codebook entry is identified, the encoder may code the resulting index and transmit it to a decoder (box 340).

Optionally, in an adaptive process shown in FIG. 10 in phantom, when an encoder identifies a best matching filter from the codebook, it may compare the newly generated interpolation filter with the codebook's filter (box 350). If the differences between the two filters exceed a predetermined error threshold, the encoder may transmit filter characteristics to the decoder, which may cause the decoder to store the characteristics as a new codebook entry (boxes 360-370). If the differences do not exceed the error threshold, the encoder may simply transmit the index of the matching codebook (box 340).

The decoder that receives the integer motion vector, reference frame index and VQ interpolation filter index may use this data to perform motion compensation.

FIG. 11 is a simplified block diagram of a decoder 400 according to an embodiment of the present invention. The decoder 400 may include a block-based decoder 402 that may include a variable length decoder 410, an inverse quantizer 420, an inverse transform unit 430 and an adder 440. The decoder 400 further may include a prediction unit 404 that may include a reference picture cache 450, a motion compensated predictor 460, a codebook 470 and an interpolation filter 480. The prediction unit 404 may generate a predicted pixel block in response to motion compensation data, such as motion vectors and codebook indices received from a channel. The block-based decoder 402 may decode coded pixel block data with reference to the predicted pixel block data to recover pixel data of the pixel blocks.

Specifically, the coded video data may include motion vectors and codebook indices that govern operation of the prediction unit 404. The reference picture cache 450 may store recovered image data of previously decoded frames that were identified as candidates for prediction of later-received coded video data (e.g., decoded I- or P-frames). The motion compensated predictor 460, responsive to mcblock motion vector data, may retrieve a reference mcblock from identified frame(s) stored in the reference picture cache. Typically, a signal reference mcblock is retrieved when decoding a P-coded block and a pair of reference mcblocks are retrieved and averaged together when decoding a B-coded block. The motion compensated predictor 460 may output the resultant mcblock and, optionally, pixels located near to the reference mcblocks, to the interpolation filter 480.

The codebook 470 may supply filter parameter data to the interpolation filter 480 in response to a codebook index received from the channel data associated with the mcblock being decoded. The codebook 470 may be provisioned as storage and control logic to store filter parameter data and output search data in response to a codebook inbox. The interpolation filter 480 may filter the predicted mcblock based on parameter data applied by the codebook 470. The output of the interpolation filter 480 may be input to the block-based decoder 402.

With respect to the block-based decoder 402, the coded video data may include coded residual coefficients that have been entropy coded. A variable length decoder 410 may decode data received from a channel buffer according to an entropy coding process to recover quantized coefficients therefrom. The inverse quantizer 420 may multiply coefficient data received from the inverse variable length decoder 410 by a quantization parameter received in the channel data. The inverse quantizer 420 may output recovered coefficient data to the inverse transform unit 430. The inverse transform unit 430 may transform dequantized coefficient data received from the inverse quantizer 420 to pixel data. The inverse transform unit 430, as its name implies, performs the converse of transform operations performed by the transform unit of an encoder (e.g., DCT or wavelet transforms). An adder 440 may add, on a pixel-by-pixel basis, pixel residual data obtained by the inverse transform unit 430 with predicted pixel data obtained from the prediction unit 404. The adder 440 may output recovered mcblock data, from which a recovered frame may be constructed and rendered at a display device (not shown).

Figure 12:
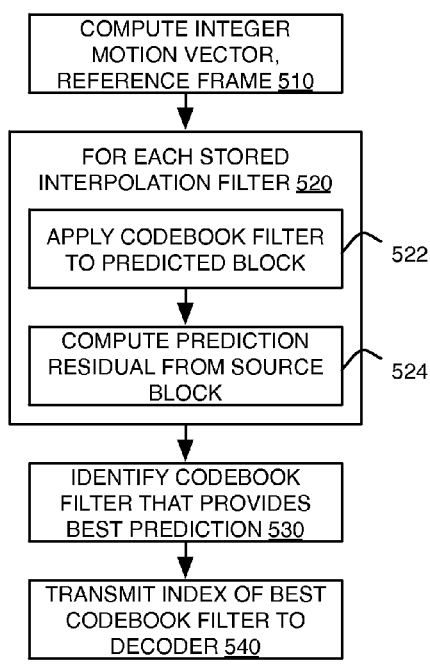
FIG. 12 illustrates a method according to a further embodiment of the present invention.

FIG. 12 illustrates a method according to another embodiment of the present invention. For each mcblock, an integer motion vector and reference frame may be computed according to traditional techniques (box 510). Then, an N×N Wiener interpolation filter may be selected by serially determining prediction results that would be obtained by each filter stored in the codebook (box 220). Specifically, for each mcblock, the method may perform filtering operations on a predicted block using either all or a subset of the filters in succession (box 522) and estimate a prediction residual obtained from each codebook filter (box 524). The method may determine which filter configuration gives the best prediction (box 530). The index of that filter may be coded and transmitted to a decoder (box 540). This embodiment, conserves processing resources that otherwise might be spent computing Wiener filters for each source mcblock.

Simplifying Calculation of Wiener Filters

In another embodiment, select filter coefficients may be forced to be equal to other filter coefficients. This embodiment can simplify the calculation of Wiener filters.

Derivation of a Wiener filter for a mcblock involves derivation of an ideal N×1 filter F according to:

$$F = S^{-1} R$$

that minimizes the mean squared prediction error. For each pixel p in the mcblock, the matrix F yields a predicted pixel $\hat{p}$ by $\hat{p} = F^T \cdot Q_p$, and a prediction error represented by $err = p - \hat{p}$.

More specifically, for each pixel p, the vector $Q_p$ may take the form:

$$Q_p = \begin{bmatrix} q_1 \\ q_2 \\ \vdots \\ q_N \end{bmatrix},$$

where $q_1$ to $q_N$ represent pixels in or near the translated reference mcblock to be used in the prediction of p.

In the foregoing, R is an N×1 cross-correlation matrix derived from uncoded pixels (p) to be coded and their corresponding $Q_p$ vectors. In the R matrix, ri at each location i may be derived as p·qi averaged over the pixels p in the mcblock. S is an N×N auto-correlation matrix derived from the N×1 vectors $Q_p$. In the S matrix, si,j at each location i,j may be derived as qi·qj averaged over the pixels p in the mcblock. Alternatively, the cross-correlation matrices and auto-correlation matrices may be averaged over a larger surrounding area having similar motion and detail as the mcblock.

Derivation of the S and R matrices occurs for each mcblock being coded. Accordingly, derivation of the Wiener filters involves substantial computational resources at an encoder. According to this embodiment, select filter coefficients in the F matrix may be forced to be equal to each other, which reduces the size of F and, as a consequence, reduces the computational burden at the encoder. Consider an example where filter coefficients $f_1$ and $f_2$ are set to be equal each other. In this embodiment, the F and $Q_p$ matrices may be modified as:

$$F = \begin{bmatrix} f_1 \\ f_3 \\ \vdots \\ f_N \end{bmatrix} \text{ and } Q_p = \begin{bmatrix} q_1 + q_2 \\ q_3 \\ \vdots \\ q_N \end{bmatrix}.$$

Deletion of the single coefficient reduces the size of F and $Q_p$ both to N−1×1. Deletion of other filter coefficients in F and consolidation of values in $Q_p$ can result in further reductions to the sizes of the F and $Q_p$ vectors. For example, it often is advantageous to delete filter coefficients at all positions (save one) that are equidistant to each other from the pixel p. In this manner, derivation of the F matrix is simplified.

Figure 13:
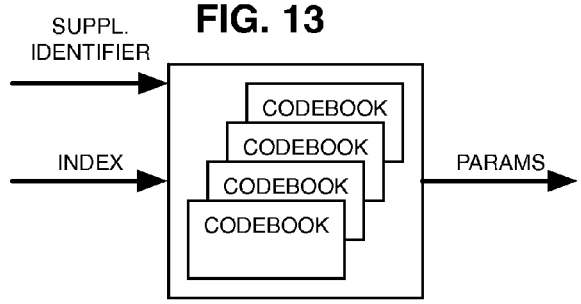
FIG. 13 illustrates a codebook architecture according to an embodiment of the present invention.

In another embodiment, encoders and decoders may store separate codebooks that are indexed not only by the filter index but also by supplemental identifiers (FIG. 13). In such embodiments, the supplemental identifiers may select one of the codebooks as being active and the index may select an entry from within the codebook to be output to the interpolation filter.

Figure 14:
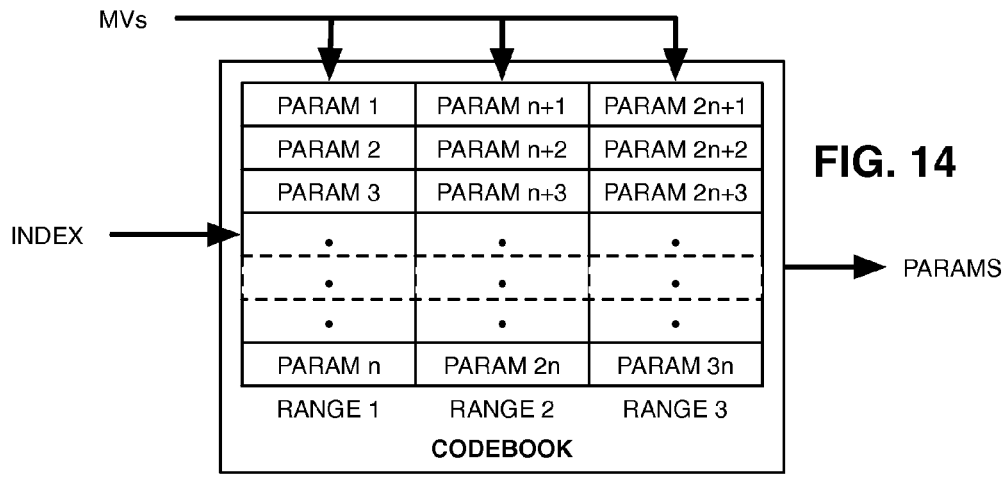
FIG. 14 illustrates a codebook architecture according to another embodiment of the present invention.

The supplemental identifier may be derived from many sources. In one embodiment, a block's motion vector may serve as the supplemental identifier. Thus, separate codebooks may be provided for each motion vector value or for different ranges of integer motion vectors (FIG. 14). Then in operation, given the value of integer motion vector and reference frame index, the encoder and decoder both may use the corresponding codebook to recover the filter to be used in motion compensation.

In another embodiment, separate codebooks may be provided for different values or ranges of values of deblocking filters present in the current or reference frame. Then in operation, given the values of the deblocking filters, the encoder and decoder use the corresponding codebook to recover the filter to be used in motion compensation.

Figure 15:
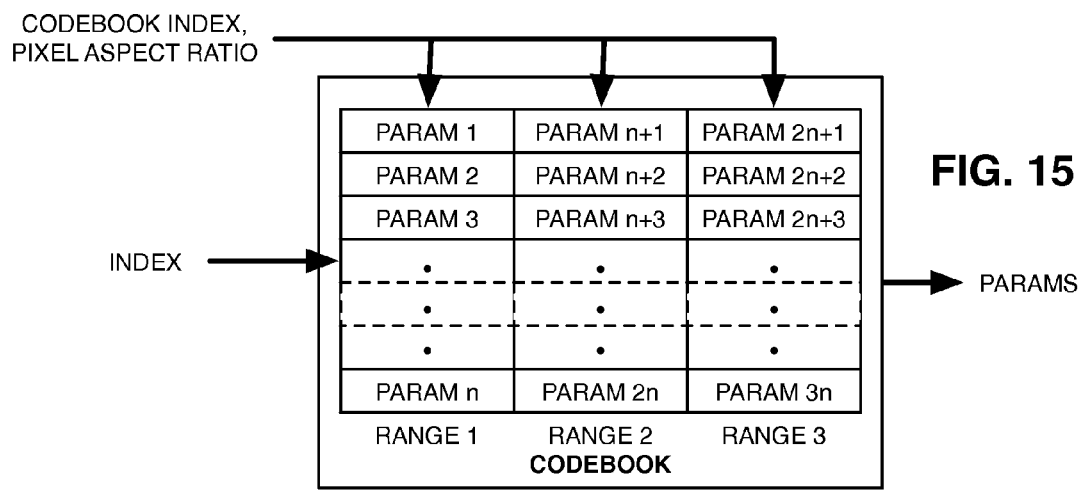
FIG. 15 illustrates a codebook architecture according to a further embodiment of the present invention.

In a further embodiment, shown in FIG. 15, separate codebooks may be provided for different values or ranges of values of other codec parameters such as pixel aspect ratio and bit rate. Then in operation, given the values of these other codec parameters, the encoder and decoder use the corresponding codebook to recover the filter to be used in motion compensation.

In another embodiment, separate codebooks may be provided for P-frames and B-frames or, alternatively, for coding types (P- or B-coding) applied to each mcblock.

In a further embodiment, different codebooks may be generated from discrete sets of training sequences. The training sequences may be selected to have consistent video characteristics within the feature set, such as speeds of motion, complexity of detail and/or other parameters. Then separate codebooks may be constructed for each value or range of values of the feature set. Features in the feature set, or an approximation thereto, may be either coded and transmitted or, alternatively, derived from coded video data as it is received at the decoder. Thus, the encoder and decoder will store common sets of codebooks, each tailored to characteristics of the training sequences from which they were derived. In operation, for each mcblock, the characteristics of input video data may be measured and compared to the characteristics that were stored from the training sequences. The encoder and decoder may select a codebook that corresponds to the measured characteristics of the input video data to recover the filter to be used in motion compensation.

In yet another embodiment, an encoder may construct separate codebooks arbitrarily and switch among the codebooks by including an express codebook specifier in the channel data.

Toppling Between Fractional Motion Vectors and Integer Motion Vectors

Use of vector coded codebooks to select interpolation filters advantageously allows a video coder to select motion vectors that are integers and to avoid the additional data that would be required to code motion vectors as fractions (e.g., half or quarter pixel distances). In an embodiment, an encoder may toggle between two modes of operation: a first mode in which motion vectors may be coded as fractional values and a default interpolation filter is used for predicted mcblocks and a second mode in which motion vectors are coded as integer distances and the vector coded interpolation filters of the foregoing embodiments are used. Such a system allows an encoder to manage computational resources needed to perform video coding and accuracy of prediction.

In such an embodiment, when fractional motion vectors are communicated from an encoder to a decoder, both units may build a new interpolation filter from the fractional motion vectors and characteristics of the default interpolation filter and store it in the codebook. In this manner, if an encoder determines that more accurate interpolation is achieved via the increased bit rate of fractional motion vectors, the resultant interpolation filter may be stored in the codebook for future use if the interpolation were needed again.

Figure 16:
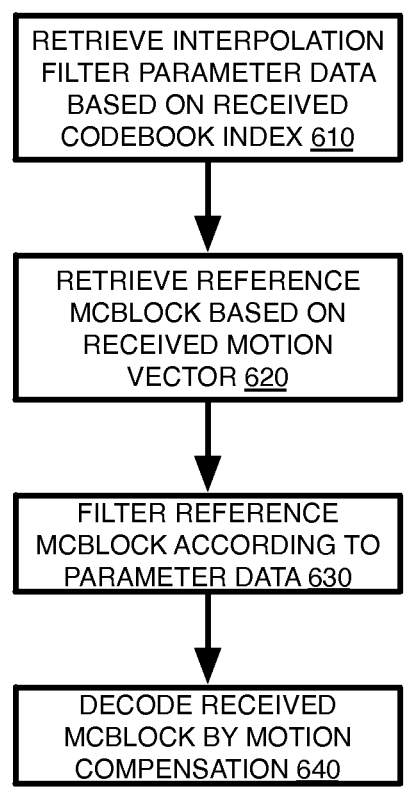
FIG. 16 illustrates a decoding method according to an embodiment of the present invention.

FIG. 16 illustrates a decoding method 600 according to an embodiment of the present invention. The method 600 may be repeated for each coded mcblock received by a decoder from a channel for which integer motion vectors are provided. According to the method, a decoder may retrieve parameters of an interpolation from a local codebook based on an index received in the channel data for the coded mcblock (box 610). The decoder further may retrieve data of a reference mcblock based on a motion vector received from the channel for the coded mcblock (box 620). As noted, depending on the interpolation filter specified by the codebook index, the decoder may retrieve data in excess of a mcblock; for example, the decoder may retrieve pixels adjacent to the mcblock's boundary based on the size of the filter. The method may apply the interpolation filter to the retrieved reference mcblock data (box 630) and decode the coded mcblock by motion compensation using the filtered reference mcblock as a prediction reference (box 640).

Minimizing Mean Square Error Between Filtered Current Mcblocks and their Corresponding Reference Mcblocks

Normally, interpolation filters are designed by minimizing the mean square error between the current mcblocks and their corresponding reference mcblocks over each frame or part of a frame. In an embodiment, the interpolation filters may be designed to minimize the mean square error between filtered current mcblocks and their corresponding reference mcblocks over each frame or part of a frame. The filters used to filter the current mcblocks need not be standardized or known to the decoder. They may adapt to parameters such as those mentioned above, or to others unknown to the decoder such as level of noise in the incoming video.

Synchronized, Local Codebook Generation at Encoder and Decoder

In another embodiment, encoders and decoder may generate interpolation codebooks independently but in synchronized fashion. Codebook managers (not shown) within the encoder and decoder each may generate interpolation filters using pixel values of decoded frames and may revise their codebooks based on the interpolation filters obtained thereby. If a newly-generated filter is stored to a codebook, the filter may be referenced during coding of later-received video data. Such an embodiment can avoid transmission of filter parameter data over the channel and thereby conserve bandwidth for other coding processes.

FIG. 17 illustrates a method operable at a coder, according to an embodiment of the present invention. In the method, the encoder may initialize a codebook (box 710), for example, by opening a default codebook on start up or by building the codebook from set(s) of training video. Further, it is permissible to initialize the codebook to a null state (no codebook); in this latter case, the codebook may begin as empty but will build quickly during runtime coding. During runtime, the encoder may code and decode a new mcblock (box 720) as described in the foregoing embodiments and, as part of this process, the encoder may search the codebook for a best-matching interpolation filter (boxes 720, 730). The encoder may transmit its codebook identifier to the decoder, along with the coded video data (box 740).

The method 700 further may compute parameters of an ideal interpolation filter for the coded mcblock, using the decoded mcblock data as a reference (box 750). The method may search the codebook to determine if an already-stored codebook entry that best matches the ideal filter (box. 760). If the difference between the two filters exceeds a predetermined error threshold, the encoder may store characteristics of the new filter to the codebook (box 770). If the differences do not exceed the error threshold, the encoder may conclude operation for the current mcblock. The encoder need not transmit parameter data of the new filter to the decoder.

FIG. 18 illustrates a method 800 operable at a decoder according to an embodiment. In the method 800, the decoder may initialize a locally-stored codebook to a same condition as the encoder's codebook (box 810). Again, the codebook may be opened from a default codebook, may be built using common training sequences as used at the encoder or may be opened as an "empty" codebook.

During runtime coding, the method 800 may decode coded mcblocks received from the encoder, using integer motion vectors, reference frame indices and other coding parameters contained in the channel. As part of this process, the method 800 may retrieve and apply interpolation filter parameter data from the codebook as identified by the encoder (boxes 820, 830). Recovered video data obtained from the decoding and filtering may be output from the decoder for rendering and may be stored in the reference picture cache for use in decoding subsequently-received frames.

The method 800 further may compute parameters of an ideal interpolation filter for the coded mcblock, using the decoded mcblock as a basis for comparison with the predicted mcblock (box 840). Since the decoded mcblock data obtained the decoder should be identical to the decoded mcblock data at the encoder, the encoder and decoder should obtain identical filters. The method may search the codebook to determine if an already-stored codebook entry that best matches the ideal filter (box 850). If the differences between the two filters exceed a predetermined error threshold, the method 800 may store characteristics of the new filter to the codebook (box 860). If the differences do not exceed the error threshold, the method 800 may conclude operation for the current mcblock. The decoder need not communicate with the encoder to revise its copy of the codebook.

The foregoing discussion has presented the methods 700 and 800 as operating on decoded mcblock data, which is obtained by a prediction unit in the encoder and the decoder. Such decoding operations often include deblocking filters included within a synchronized coding loop. In an embodiment, calculations of new filters may be performed using decoded, deblocked video. Alternatively, calculation of new filters may be performed using decoded but non-deblocked video.

Although the encoder and decoder need not communicate with each other, improved performance may be obtained by other embodiments of the present invention, which involve low bandwidth communication between the encoder and decoder. In one embodiment, for example, the encoder may include a flag with coded mcblock data that indicates to the decoder whether to use deblocked decoded data or non-deblocked decoded data when computing filter parameters. In such an embodiment, the encoder may calculate characteristics of an ideal interpolation filter using both types of source data—first, using deblocked, decoded data and second, using non-deblocked, decoded data. The encoder further may identify, with reference to the source video data, which of the two filters generates the least error. The encoder may set a short flag in the channel, possibly a single bit, data to identify to the decoder which process is to be used during decode.

The embodiments of FIGS. 17 and 18 provide encoders and decoders that concurrently maintain codebooks based on coded video data without requiring expressly communication to synchronize these efforts. Although these embodiments are bandwidth-efficient, improper operation may arise in the event of channel errors that corrupt data received at the decoder. In the event of such an error, decoded mcblock data may be corrupt or unavailable. Thus, the decoder's codebook may lose synchronization with the encoder's codebook.

Embodiments of the present invention provide for exchange of an error mitigation protocol to reduce errors that might arise from communication errors. For example, an encoder and decoder may operate under a codebook management policy in which the encoder and decoder each reset the codebook to a predetermined state at predetermined intervals. For example, they may reset their codebooks to the initialized state at such intervals (boxes 710, 810). Alternatively, the encoder and decoder may purge codebook entries associated with predetermined types of coded data, retaining other types. For example, encoders and decoder that use Long Term Reference frames (LTRs) as part of their coding protocols may purge codebook entries associated with all frames except LTR frames. In such protocols, encoders receive acknowledgment messages from decoders indicating that LTR frames were received and successfully decoded. In another embodiment, an encoder may command a decoder to reset its codebook by placing an appropriate signal in the channel data. Codebook management messages likely are to be more bandwidth efficient than other systems in which the encoder and decoder exchange data expressly defining filter parameters.

As in the prior embodiments, the interpolation filters may be calculated as an N×N Wiener interpolation filter constructed for the decoded mcblock by computing cross-correlation matrices and auto-correlation matrices over the mcblock. Alternatively, the cross-correlation matrices and auto-correlation matrices may be averaged over a larger surrounding area that has similar motion and detail as the mcblock. The interpolation filter may be a rectangular interpolation filter or a circularly-shaped Wiener interpolation filter.

Also as in the prior embodiments, select filter coefficients may be forced to be equal to other filter coefficients. This embodiment can simplify the calculation of Wiener filters.

Derivation of a Wiener filter for a mcblock involves derivation of an ideal N×1 filter F according to:

$$F = S^{-1} R$$

that minimizes the mean squared prediction error. For each pixel $p_{dec}$ in the decoded mcblock, the matrix F yields a predicted pixel $\hat{p}$ by $\hat{P} = F^T \cdot Q_{dec}$ and a prediction error represented by $err = p_{dec} - \hat{p}$.

More specifically, for each $p_{dec}$, the vector $Q_{dec}$ may take the form:

$$Q_{dec} = \begin{bmatrix} q_1 \\ q_2 \\ \vdots \\ q_n \end{bmatrix},$$

where $q_1$ to $q_N$ represent pixels in or near the translated reference mcblock to be used in the prediction of $p_{dec}$.

In the foregoing, R is an N×1 cross-correlation matrix derived from decoded pixels ($p_{dec}$) to be coded and their corresponding $Q_{dec}$ vectors. In the R matrix, ri at each location i may be derived as $p_{dec} \cdot qi$ averaged over the pixels p in the mcblock. S is an N×N auto-correlation matrix derived from the N×1 vectors $Q_{dec}$. In the S matrix, si,j at each location i,j may be derived as qi·qj averaged over the pixels p in the mcblock. Alternatively, the cross-correlation matrices and auto-correlation matrices may be averaged over a larger surrounding area having similar motion and detail as the mcblock.

Derivation of the S and R matrices occurs for each mcblock being coded. Accordingly, derivation of the Wiener filters involves substantial computational resources at an encoder. According to this embodiment, select filter coefficients in the F matrix may be forced to be equal to each other, which reduces the size of F and, as a consequence, reduces the computational burden at the encoder. Consider an example where filter coefficients f1 and f2 are set to be equal each other. In this embodiment, the F and $Q_{dec}$ matrices may be modified as:

$$F = \begin{bmatrix} f_1 \\ f_3 \\ \vdots \\ f_N \end{bmatrix} \text{ and } Q_{dec} = \begin{bmatrix} q_1 + q_2 \\ q_3 \\ \vdots \\ q_n \end{bmatrix}.$$

Deletion of the single coefficient reduces the size of F and $Q_{dec}$ both to N−1×1. Deletion of other filter coefficients in F and consolidation of values in $Q_{dec}$ can result in further reductions to the sizes of the F and $Q_{dec}$ vectors. For example, it often is advantageous to delete filter coefficients of at all positions (save one) that are equidistant to each other from the decoded pixel $p_{dec}$. In this manner, derivation of the F matrix is simplified.

In another embodiment, encoders and decoders may store separate codebooks that are indexed not only by the filter index but also by supplemental identifiers (FIG. 13). In such embodiments, the supplemental identifiers may select one of the codebooks as being active and the index may select an entry from within the codebook to be output to the interpolation filter. The decoder may use the supplemental identifiers both to read codebook entries during filtering of decoded data and to build new entries in the codebooks.

In one embodiment, a block's motion vector may serve as the supplemental identifier. Thus, separate codebooks may be provided for each motion vector value or for different ranges of integer motion vectors. Then in operation, given the value of integer motion vector and reference frame index, the encoder and decoder both may use the corresponding codebook to recover the filter to be used in motion compensation.

In another embodiment, separate codebooks may be provided for different values or ranges of values of deblocking filters present in the current or reference frame. Then in operation, given the values of the deblocking filters, the encoder and decoder use the corresponding codebook to recover the filter to be used in motion compensation.

In a further embodiment, separate codebooks may be provided for different values or ranges of values of other codec parameters such as pixel aspect ratio and bit rate. Then in operation, given the values of these other codec parameters, the encoder and decoder use the corresponding codebook to recover the filter to be used in motion compensation.

In another embodiment, separate codebooks may be provided for P-frames and B-frames or, alternatively, for coding types (P- or B-coding) applied to each mcblock.

In another embodiment, an encoder and decoder may switch among codebooks in response to scene changes detected within the video data. In one embodiment, the encoder and decoder may execute a common scene change algorithm independently of each other, each system detecting scene changes from image content of the decoded video data. In another embodiment, the encoder may execute the scene change detection algorithm and include signals within the channel data identifying scene changes to a decoder. Optionally, in such embodiments, the encoder and decoder may reset their codebooks when a scene change occurs.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 8 illustrates the components of the block-based coding chain 110 and prediction unit 120 as separate units, in one or more embodiments, some or all of them may be integrated and they need not be separate units. Such implementation details are immaterial to the operation of the present invention unless otherwise noted above.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. A codebook management method comprising, at a video processing device:
   decoding coded pixel block data according to motion compensated prediction techniques to generate decoded video data,
   calculating characteristics of an ideal interpolation filter based on the decoded video data, the ideal interpolation filter calculated with a cross-correlation matrix and an auto-correlation matrix between uncoded pixel block data and the decoded pixel block data,
   adding the calculated characteristics to a codebook stored at the video processing device for use with later received pixel blocks, the characteristics including filter configuration data that defines the operation of the interpolation filter.

2. The method of claim 1, wherein the video processing device is a video encoder and the method further comprises coding an input pixel block data according to motion compensated prediction, the coding including:
   identifying a pixel block from a reference frame as a prediction reference,
   calculating characteristics of an ideal filter to be applied to the identified pixel block to match the input pixel block,
   searching the codebook to identify a matching codebook filter,
   if a match is found, coding the input pixel block with respect to the reference pixel block having been filtered by the matching codebook filter, and
   transmitting coded data of the input pixel block and an identifier of the matching codebook filter to a decoder.

3. The method of claim 2, wherein a matching codebook is identified if the difference between the calculated filter and an identified best matching codebook filter does not exceed a predetermined threshold.

4. The method of claim 3, wherein if the difference exceeds the predetermined threshold, adding the calculated filter to the codebook and transmitting the calculated filter characteristics to the decoder.

5. The method of claim 1, wherein the video processing device is a video decoder and the decoding further comprises:
   identifying, based on the coded pixel block data, a pixel block from a reference frame as a prediction reference,
   filtering the identified pixel block based on interpolation filter parameters then-stored in the codebook, the parameters identified by a codebook index received by the decoder,
   decoding the pixel block with reference to the filtered reference pixel block.

6. The method of claim 1, further comprising resetting the codebook at predetermined intervals.

7. The method of claim 1, further comprising resetting the codebook in response to a predetermined command exchanged between a video encoder and a video decoder.

8. The method of claim 1, further comprising resetting the codebook on detection of a scene change.

9. The method of claim 1, further comprising resetting the codebook to an empty state.

10. The method of claim 1, further comprising resetting the codebook to a predetermined state.

11. The method of claim 1, further comprising purging from the codebook entries associated with a predetermined coding assignment type.

12. The method of claim 1, further comprising purging from the codebook all entries except entries expressly acknowledged between a video encoder and a video decoder.

13. The method of claim 1, wherein the decoded video data is decoded, deblocked video data.

14. The method of claim 1, wherein the decoded video data is decoded, non-deblocked video data.

15. The method of claim 1, wherein the decoded video data is selected from:
   1) decoded, deblocked video data, and
   2) decoded, non-deblocked video data
   in response to an identifier exchanged between a video coder and a video decoder.

16. The method of claim 1, wherein the cross correlation matrix and the auto correlation matrix are averaged over the pixel block.

17. The method of claim 1, wherein the cross correlation matrix and the auto correlation matrix are averaged over an area larger than and surrounding the pixel block.

18. A video coding method, comprising:
   coding an input pixel block data according to motion compensated prediction, the coding including:
   identifying a pixel block from a reference frame as a prediction reference,
   calculating characteristics of an ideal filter to be applied to the identified pixel block to match the input pixel block, the ideal filter calculated with a cross-correlation matrix and an auto-correlation matrix between uncoded pixel block data and the decoded pixel block data,
   searching a codebook of previously-stored filter characteristics to identify a matching codebook filter,
   if a match is found, coding the input pixel block with respect to the reference pixel block having been filtered by the matching codebook filter, and
   transmitting the coded pixel block data and an identifier of the matching codebook filter to a decoder;
   decoding coded pixel block data according to motion compensated prediction techniques to generate decoded video data,
   calculating characteristics of an ideal interpolation filter based on the decoded video data,
   adding the calculated characteristics to the codebook for use in decoding later-received input pixel block data, the characteristics including filter configuration data that defines the operation of the interpolation filter.

19. The video coding method of claim 18, wherein the codebook is chosen from a plurality of stored codebooks, the codebook selected by a codebook identifier.

20. The video coding method of claim 18, wherein the codebook is chosen from a plurality of stored codebooks, the codebook selected by a motion vector calculated for the input block.

21. The video coding method of claim 18, wherein the codebook is chosen from a plurality of stored codebooks, the codebook selected by an aspect ratio calculated for the input block.

22. The video coding method of claim 18, wherein the codebook is chosen from a plurality of stored codebooks, the codebook selected by coding type assigned to the input block.

23. The video coding method of claim 18, wherein the codebook is chosen from a plurality of stored codebooks, the codebook selected by an indicator of the input block's complexity.

24. The video coding method of claim 18, wherein the codebook is chosen from a plurality of stored codebooks, the codebook selected by an encoder bit rate.

25. The video coding method of claim 18, wherein the codebook is chosen from a plurality of stored codebooks of the plurality of codebooks generated from a respective set of training sequences.

26. The video coding method of claim 18, wherein the coded data of the input pixel block includes motion vectors having integer values.

27. The video coding method of claim 18, further comprising resetting the codebook at predetermined intervals.

28. The video coding method of claim 18, further comprising resetting the codebook in response to a predetermined command exchanged between a video encoder and a video decoder.

29. The video coding method of claim 18, further comprising resetting the codebook on detection of a scene change.

30. The video coding method of claim 18, further comprising resetting the codebook to an empty state.

31. The video coding method of claim 18, further comprising resetting the codebook to a predetermined state.

32. A video decoding method, comprising:
   decoding coded pixel block data according to motion compensated prediction to generate decoded video data, the coding including:
   retrieving predicted pixel block data from a reference store according to a motion vector,
   retrieving filter parameter data from a codebook store according to a codebook index,
   filtering the predicted pixel block data according to the parameter data, wherein the coded pixel block decoding is performed using the filtered pixel block data as a prediction reference,
   calculating characteristics of an ideal interpolation filter based on the decoded video data, the ideal interpolation filter calculated with a cross-correlation matrix and an auto-correlation matrix between uncoded pixel block data and the decoded pixel block data,
   adding the calculated characteristics to the codebook for use with later received coded pixel blocks, the characteristics including filter configuration data that defines the operation of the interpolation filter.

33. The method of claim 32, wherein the codebook is chosen from a plurality of stored codebooks, the codebook selected by a codebook identifier.

34. The method of claim 32, wherein the codebook is chosen from a plurality of stored codebooks, the codebook selected by a motion vector of the coded pixel block.

35. The method of claim 32, wherein the codebook is chosen from a plurality of stored codebooks, the codebook selected by a pixel aspect ratio.

36. The method of claim 32, wherein the codebook is chosen from a plurality of stored codebooks, the codebook selected by coding type of the coded pixel block.

37. The method of claim 32, wherein the codebook is chosen from a plurality of stored codebooks, the codebook selected by an indicator of the coded pixel block's complexity.

38. The method of claim 32, wherein the codebook is chosen from a plurality of stored codebooks, the codebook selected by a bit rate of coded video data.

39. The method of claim 32, further comprising resetting the codebook at predetermined intervals.

40. The method of claim 32, further comprising resetting the codebook in response to a predetermined command exchanged between a video encoder and a video decoder.

41. The method of claim 32, further comprising resetting the codebook on detection of a scene change.

42. The method of claim 32, further comprising resetting the codebook to an empty state.

43. The method of claim 32, further comprising resetting the codebook to a predetermined state.

44. The method of claim 32, further comprising purging from the codebook entries associated with a predetermined coding assignment type.

45. The method of claim 32, further comprising purging from the codebook all entries except entries expressly acknowledged between a video encoder and a video decoder.

46. The method of claim 32, wherein the decoded video data is decoded, deblocked video data.

47. The method of claim 32, wherein the decoded video data is decoded, non-deblocked video data.

48. The method of claim 32, wherein the decoded video data is selected from:
   1) decoded, deblocked video data, and
   2) decoded, non-deblocked video data
   in response to an identifier exchanged between a video coder and a video decoder.

49. A video encoder, comprising:
   a block-based coder to encode coded pixel blocks by motion compensated prediction,
   a prediction unit to supply predicted pixel block data to the block-based encoder, the prediction unit, comprising:
   a motion compensated predictor having an output for pixel block data,
   an interpolation filter coupled to an output of the motion compensated predictor and having an output for filtered pixel block data, to search a codebook of previously-stored filter characteristics to identify a matching codebook filter, and
   codebook storage, storing plural sets of configuration parameters for the interpolation filter,
   a codebook manager to:
   calculate characteristics of an ideal interpolation filter based on decoding the coded pixel blocks, the ideal interpolation filter calculated with a cross-correlation matrix and an auto-correlation matrix between uncoded pixel block data and the decoded pixel block data,
   add the calculated characteristics to the codebook for use with later received pixel blocks, the characteristics including filter configuration data that defines the operation of the interpolation filter.

50. A video decoder, comprising:
a block-based decoder to decode coded pixel blocks by motion compensated prediction,
a prediction unit to supply predicted pixel block data to the block-based decoder, the prediction unit, comprising:
  a motion compensated predictor having an output for pixel block data,
  an interpolation filter coupled to an output of the motion compensated predictor and having an output for filtered pixel block data, and
codebook storage, storing plural sets of configuration parameters for the interpolation filter, responsive to a codebook index received with coded pixel block data to supply a set of configuration parameters to the interpolation filter,
a codebook manager to:
  calculate characteristics of an ideal interpolation filter based on the decoded video data, the ideal interpolation filter calculated with a cross-correlation matrix and an auto-correlation matrix between uncoded pixel block data and the decoded pixel block data,
  add the calculated characteristics to the codebook for use with later received pixel blocks, the characteristics including filter configuration data that defines the operation of the interpolation filter.

* * * * *